United States Patent
Deng et al.

(10) Patent No.: US 10,118,610 B2
(45) Date of Patent: Nov. 6, 2018

(54) AUTONOMOUS VEHICLE USING PATH PREDICTION

(71) Applicant: Ford Global Technologies, LLC, Dearborn, MI (US)

(72) Inventors: Kun Deng, Ann Arbor, MI (US); Wangdong Luo, Auburn Hills, MI (US); Nanjun Liu, Ann Arbor, MI (US); Alex Maurice Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 156 days.

(21) Appl. No.: 15/252,425

(22) Filed: Aug. 31, 2016

(65) Prior Publication Data
US 2018/0056995 A1   Mar. 1, 2018

(51) Int. Cl.
| | |
|---|---|
| *B60W 30/09* | (2012.01) |
| *B60W 10/18* | (2012.01) |
| *B60W 10/20* | (2006.01) |
| *B60W 50/00* | (2006.01) |
| *G05D 1/00* | (2006.01) |
| *G08G 1/16* | (2006.01) |
| *B62D 15/02* | (2006.01) |

(52) U.S. Cl.
CPC ............ *B60W 30/09* (2013.01); *B60W 10/18* (2013.01); *B60W 10/20* (2013.01); *B60W 50/0097* (2013.01); *B62D 15/025* (2013.01); *G05D 1/0088* (2013.01); *G08G 1/166* (2013.01); *B60W 2420/52* (2013.01); *B60W 2520/06* (2013.01); *B60W 2520/10* (2013.01); *B60W 2520/14* (2013.01); *B60W 2600/00* (2013.01); *B60W 2710/18* (2013.01); *B60W 2710/20* (2013.01); *B60W 2900/00* (2013.01)

(58) Field of Classification Search
None
See application file for complete search history.

(56) References Cited

U.S. PATENT DOCUMENTS

| | | | |
|---|---|---|---|
| 6,675,094 B2 | 1/2004 | Russell et al. | |
| 8,457,827 B1 * | 6/2013 | Ferguson | G05D 1/00 701/23 |

(Continued)

FOREIGN PATENT DOCUMENTS

| | | |
|---|---|---|
| CN | 1766232 A | 5/2006 |
| CN | 202057015 U | 11/2011 |

(Continued)

OTHER PUBLICATIONS

UKIPO Search Report for Application No. GB1713487.5 dated Feb. 8, 2018 (4 pages).

*Primary Examiner* — Jonathan M Dager
*Assistant Examiner* — Garrett F Evans
(74) *Attorney, Agent, or Firm* — Frank A. MacKenzie; Bejin Bieneman PLC (57) ABSTRACT

A controller in a host vehicle includes a processor and a memory storing processor-executable instructions. The processor is programmed to calculate an error bound for confidence intervals of a predicted position at a future time of a target vehicle relative laterally to a current position and orientation of the host vehicle at a current time based on a current position and velocity of the target vehicle and the future time.

20 Claims, 7 Drawing Sheets

(56) References Cited

U.S. PATENT DOCUMENTS

| | | |
|---|---|---|
| 8,577,550 B2 | 11/2013 | Lu et al. |
| 2003/0016143 A1 | 1/2003 | Ghazarian |
| 2007/0005609 A1 | 1/2007 | Breed |
| 2007/0030131 A1* | 2/2007 | Takahama ............. G01S 17/023 340/435 |
| 2007/0276600 A1 | 11/2007 | King et al. |
| 2008/0114530 A1 | 5/2008 | Petrisor et al. |
| 2011/0298603 A1 | 12/2011 | King et al. |
| 2012/0095646 A1 | 4/2012 | Ghazarian |
| 2013/0026916 A1 | 1/2013 | Imaeda |
| 2013/0253815 A1 | 9/2013 | Orfila et al. |
| 2014/0303882 A1 | 10/2014 | Jang et al. |
| 2014/0347207 A1 | 11/2014 | Zeng et al. |
| 2015/0066348 A1 | 3/2015 | Baba |
| 2015/0183431 A1 | 7/2015 | Nanami |
| 2015/0344030 A1 | 12/2015 | Damerow et al. |
| 2016/0325743 A1* | 11/2016 | Schmudderich .. B60W 30/0956 |

FOREIGN PATENT DOCUMENTS

| | | |
|---|---|---|
| CN | 202868581 U | 4/2013 |
| CN | 103871272 A | 6/2014 |
| CN | 103898822 A | 7/2014 |
| CN | 104134370 A | 11/2014 |
| DE | 10201106176 A1 | 2/2012 |
| DE | 102013005362 A1 | 10/2013 |
| GB | 2498438 A | 7/2013 |
| JP | H11175896 A | 7/1999 |
| JP | 2005173703 A | 6/2005 |
| JP | 2009087372 A | 4/2009 |
| JP | 2009146219 A | 7/2009 |
| JP | 2014006609 A | 1/2014 |
| WO | 2010110109 A | 9/2010 |
| WO | 2011156621 A2 | 12/2011 |

* cited by examiner

AUTONOMOUS VEHICLE USING PATH PREDICTION

BACKGROUND

Autonomous vehicles have the ability to operate without the intervention of a human operator, e.g., driver, that is, a vehicle controller makes decisions about accelerating, braking, and/or steering the vehicle. A vehicle may be fully autonomous or semi-autonomous. A semi-autonomous vehicle may be autonomous only in particular situations, for example, highway driving or parallel parking, or with respect to certain vehicle subsystems, for example, braking but not acceleration or steering.

An autonomous vehicle may include sensors for tracking an external environment surrounding the vehicle. Some types of sensors are radar sensors, scanning laser range finders, light detection and ranging (LIDAR) devices, and image processing sensors such as cameras. The vehicle controller is in communication with the sensors and uses output from the sensors to analyze the external environment, for example, defining features of a surrounding landscape, detecting roads and lanes of roads on the landscape, interpreting signs and signals, and tracking and classifying objects in the environment such as vehicles, cyclists, and pedestrians. For example, a vehicle controller may classify whether a detected object is another vehicle and provide state information about the other vehicle, such as location, speed, and heading.

The vehicle controller uses target path prediction to predict where another vehicle will travel. The vehicle controller uses the predicted path of the other vehicle to make decisions affecting operation of the vehicle. Thus, inaccuracies and failures of current path prediction technologies are problematic. There is opportunity to improve technology for predicting paths of objects such as target vehicles.

DETAILED DESCRIPTION

With reference to the Figures, wherein like numerals indicate like parts throughout the several views, a controller 34 in a host vehicle 30 includes a processor and a memory storing processor-executable instructions. The processor is programmed to calculate an error bound for confidence intervals of a predicted position at a future time of a target vehicle 32 relative laterally to a current position and orientation of the host vehicle 30 at a current time based on a current position and velocity of the target vehicle 32 and the future time.

Use of the error bound makes target path prediction, and hence autonomous operation of the host vehicle 30, more robust because the controller 34 makes decisions based on a range of the most likely predicted positions for the target vehicle 32. Furthermore, calculation of the error bound is adaptive in that the calculation updates continuously as the host vehicle 30 travels.

Figure 1:
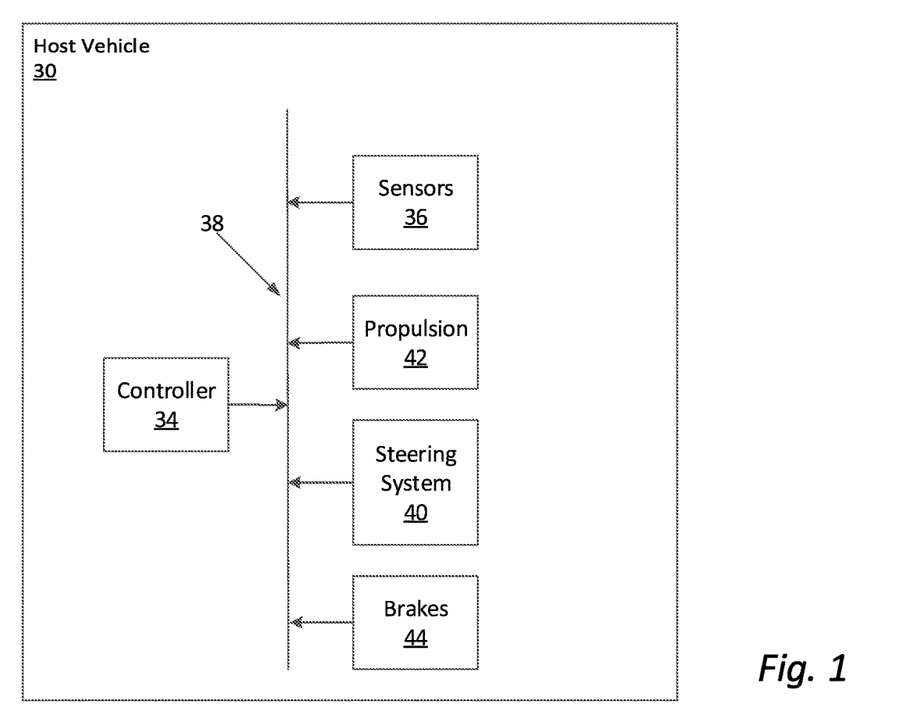
FIG. 1 is a block diagram of a host vehicle.

With reference to FIG. 1, the host vehicle 30 may be an autonomous vehicle. The controller 34, sometimes referred to as the "virtual driver," may be capable of operating the vehicle independently of the intervention of a human driver, to a greater or a lesser degree, i.e., fully autonomously and/or in a semi-autonomous mode. The controller 34 may be programmed to operate a steering system 40, a propulsion 42, brakes 44, and/or other vehicle systems. For purposes of this disclosure, fully autonomous means that each of the steering system 40, the propulsion 42, and the brakes 44 of the host vehicle 30 are controlled by the controller 34; a semi-autonomous mode is one in which one or two of the steering system 40, the propulsion 42, and the brakes 44 are operated by the controller 34.

The controller 34 carries out various operations, including as described herein. The controller 34 is a computing device that generally includes a processor and a memory, the memory including one or more forms of computer-readable media, and storing instructions executable by the processor for performing various operations, including as disclosed herein. The memory of the controller 34 further generally stores remote data received via various communications mechanisms; e.g., the controller 34 is generally configured for communications on a controller area network (CAN) bus or the like, and/or for using other wired or wireless protocols, e.g., Bluetooth, etc. The controller 34 may also have a connection to an onboard diagnostics connector (OBD-II). Via a vehicle network using Ethernet, WiFi, the CAN bus, Local Interconnect Network (LIN), and/or other wired or wireless mechanisms, the controller 34 may transmit messages to various devices in the vehicle and/or receive messages from the various devices, e.g., controllers, actuators, sensors, etc., e.g., controllers and sensors as discussed herein. For example, the controller 34 may receive data from sensors 36. Although one controller 34 is shown in FIG. 1 for ease of illustration, it is to be understood that the controller 34 could include, and various operations described herein could be carried out by, one or more computing devices.

The controller 34 may transmit signals through a communications network 38 such as a controller area network (CAN) bus, Ethernet, Local Interconnect Network (LIN), and/or by any other wired or wireless communications network. The controller 34 may be in communication with the sensors 36, the steering system 40, the propulsion 42, the brakes 44, and other vehicle subsystems and/or features.

The host vehicle 30 may include the sensors 36. The sensors 36 may detect internal states of the vehicle, for example, wheel speed, wheel orientation, and engine and transmission variables. The sensors 36 may detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 36 may detect an environment external to a body of the host vehicle 30, for example, the sensors 36 can include one or more of radar sensors, scanning laser range finders, light detection and ranging (LIDAR) devices, and image processing sensors such as cameras. The sensors 36 may include communications devices, for example, vehicle-to-infrastructure (V2I) or vehicle-to-vehicle (V2V) devices.

The steering system 40 is typically a known vehicle steering subsystem and controls the turning of wheels of the host vehicle 30. The steering system 40 is in communication with and receives input from a steering wheel and the controller 34. The steering system 40 may be a rack-and-pinion system with electric power-assisted steering, a steer-by-wire system, as are both known in the art, or any other suitable system.

The propulsion 42 of the host vehicle 30 generates energy and translates the energy into motion of the host vehicle 30. The propulsion 42 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 42 is in communication with and receives input from the controller 34 and from a human driver. The human driver may control the propulsion 42 via, e.g., an accelerator pedal and/or a gear-shift lever.

The brakes 44 are typically a known vehicle braking subsystem and are provided to resist the motion of the host vehicle 30 to thereby slow and/or stop the vehicle. The brakes 44 may be friction brakes such as disc brakes, drum brakes, band brakes, and so on; regenerative brakes; any other suitable type of brakes; or a combination. The brakes 44 are in communication with and receive input from the controller 34 and a human driver. The human driver may control the brakes 44 via, e.g., a brake pedal.

Figure 7:
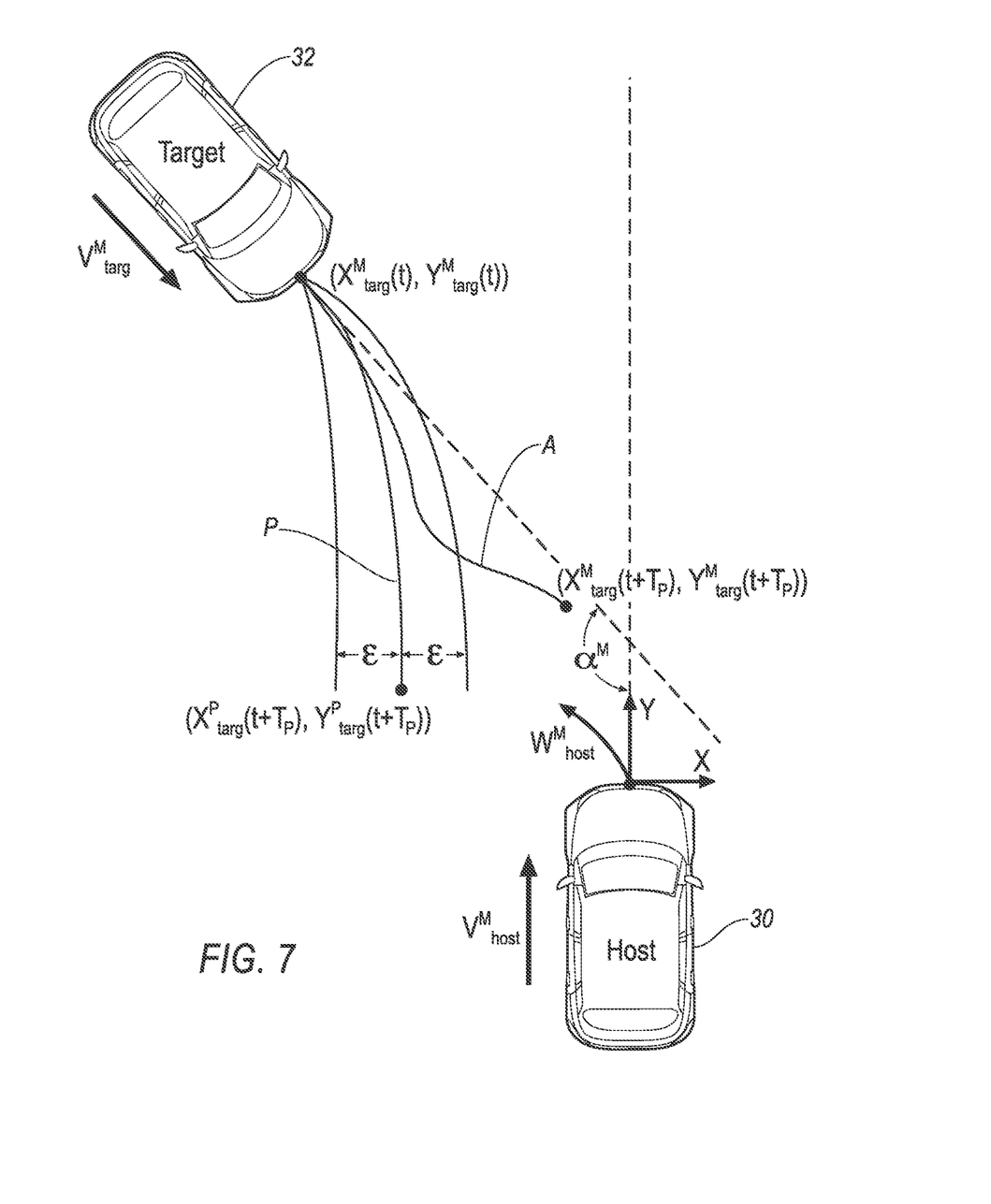
FIG. 7 is a diagram of an interaction between the host vehicle and a target vehicle.

With reference to FIG. 7, the exemplary processes described below pertain to target path prediction. The host vehicle 30 may interact with the target vehicle 32 while each are traveling. "Target path prediction" means predicting, by the host vehicle 30, a path P along which the target vehicle 32 will travel. An actual path A by the target vehicle 32 may differ from the predicted path P. Motion variables shown in FIG. 7 describing the travel of the vehicles 30, 32 are described below with respect to a block 415 in a process 400.

Figure 2:
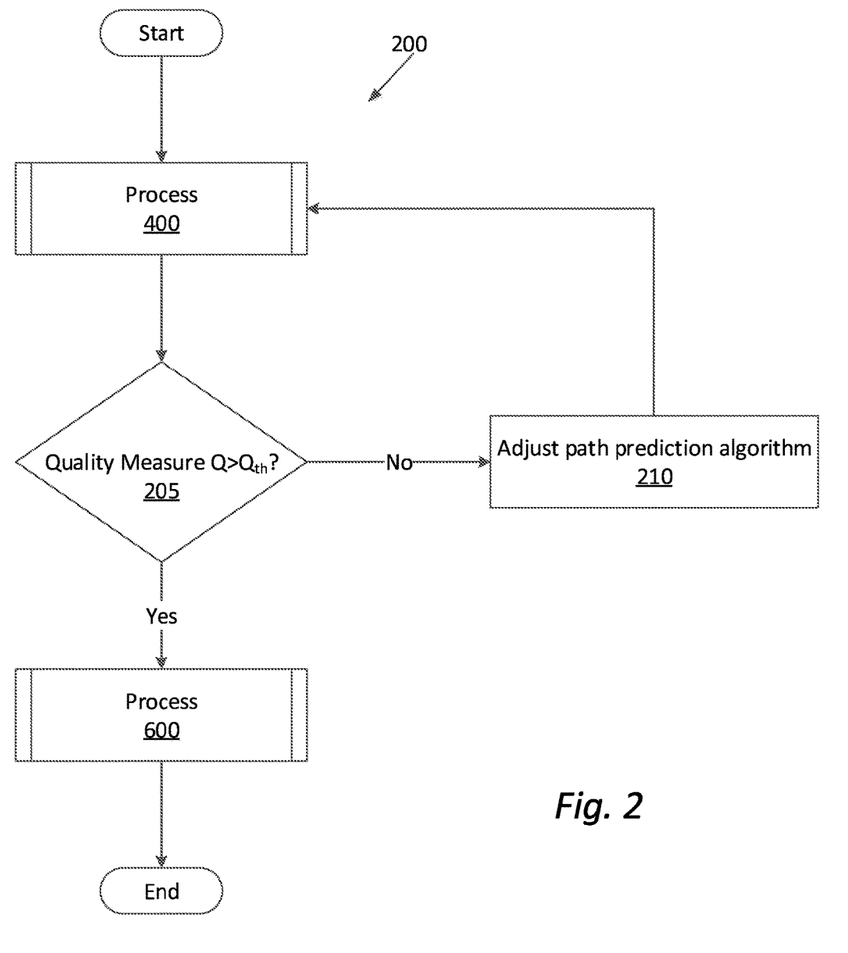
FIG. 2 is a process flow diagram of a process for implementing target path prediction on the host vehicle.

FIG. 2 is a process flow diagram illustrating an exemplary process 200 for implementing target path prediction on the host vehicle 30. The process 200 may be used by, for example, a system designer testing and implementing an algorithm for target path prediction on a type of vehicle. The process 200 begins by performing an exemplary process 400 for running a test to determine the quality of the target path prediction, shown in FIG. 4 and described below. The process 400 returns a quality measure Q of the target path prediction to the controller 34.

Next, after receiving input from the process 400, in a decision block 205, the controller 34 determines whether the quality measure Q is above a quality threshold $Q_{th}$. The quality threshold is a value chosen to ensure a sufficiently robust performance of the target path prediction.

If the quality measure Q is not above the quality threshold $Q_{th}$, next, in a block 210, a system designer adjusts a path prediction algorithm for target path prediction based on the quality measure Q. The system designer may adjust parameters for the target path prediction algorithm, such as the quadratic polynomial method, as is known (described below with respect to a block 420 of the process 400 and a block 515 of a process 500). Alternatively or additionally, the system designer may adjust parameters for the error bounds aspect of the path prediction algorithm (described below with respect to a block 525 of the process 500), for example, a lateral offset bound $\overline{x}_{targ}$ for the target vehicle 32, a longitudinal offset bound $\overline{y}_{targ}$ for the target vehicle 32, a location bound $\overline{b}$ for the target vehicle 32, a velocity bound $\overline{v}_{targ}$ for the target vehicle 32, a velocity bound $\overline{v}_{host}$ for the host vehicle 30, a yaw rate bound $\overline{w}_{host}$ for the host vehicle 30, and/or a default initialization values $\sigma_{x_{targ}}$, $\sigma_{y_{targ}}$, $\sigma_{v_{targ}}$, $\sigma_{v_{host}}$, and $\sigma_{w_{host}}$.

Figure 6:
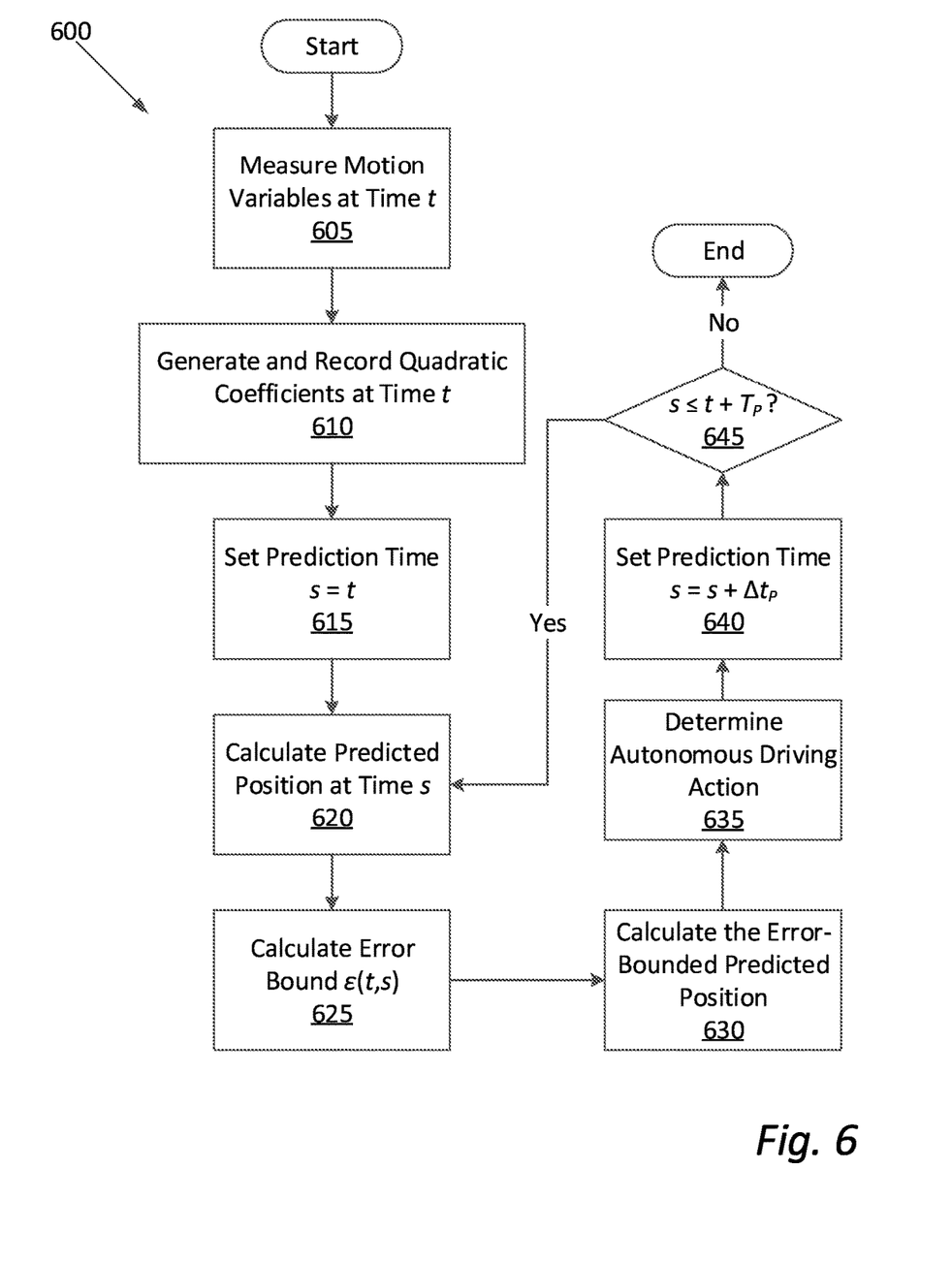
FIG. 6 is a process flow diagram of a process for operating the host vehicle using target path prediction.

If, in the decision block 205, the quality measure Q is above the quality threshold $Q_{th}$, the controller 34 performs an exemplary process 600 for operating the host vehicle 30 using target path prediction, as shown in FIG. 6 and described below. After the process 600, the process 200 ends.

Figure 3:
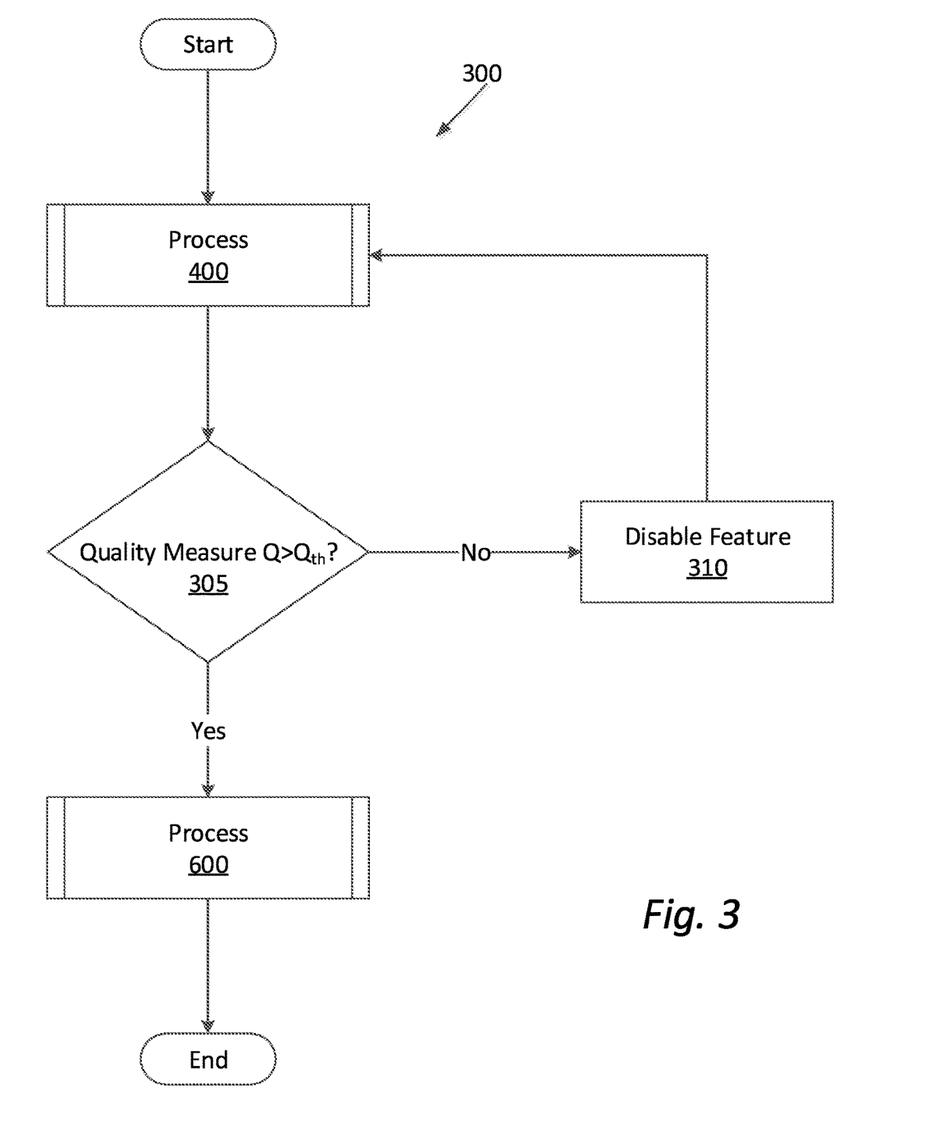
FIG. 3 is a process flow diagram of a process for disabling a feature of the host vehicle based on a quality of the target path prediction.

FIG. 3 is a process flow diagram illustrating an exemplary process 300 for disabling a feature of the host vehicle 30 based on a quality of the target path prediction. The process 300 may be performed, for example, by the controller 34 in the host vehicle 30. The process 300 begins by performing the exemplary process 400 for running a test to determine the quality of the target path prediction, shown in FIG. 4 and described below. The process 400 returns the quality measure Q of the target path prediction to the controller 34.

Next, after receiving input from the process 400, in a decision block 305, the controller 34 determines whether the quality measure Q is above a quality threshold $Q_{th}$, as described above with respect to the decision block 205.

If the quality measure Q is not above the quality threshold $Q_{th}$, next, in a block 310, the controller 34 disables a feature relying on an error bound ε (described below with respect to the block 525 of the process 500) based on the quality measure Q. Features that may rely on the error bound ε may include autonomous or semi-autonomous operation of the host vehicle 30, that is, operation of one or more of the steering system 40, propulsion 42, and brakes 44, such as automated braking or automated steering. Other features that may rely on the error bound ε may include features that may anticipate movement of the host vehicle 30, for example, automatically turning headlights.

If, in the decision block 305, the quality measure Q is above the quality threshold $Q_{th}$, the controller 34 performs the exemplary process 600 for operating the host vehicle 30 using target path prediction, as shown in FIG. 6 and described below. After the process 600, the process 300 ends.

Figure 4:
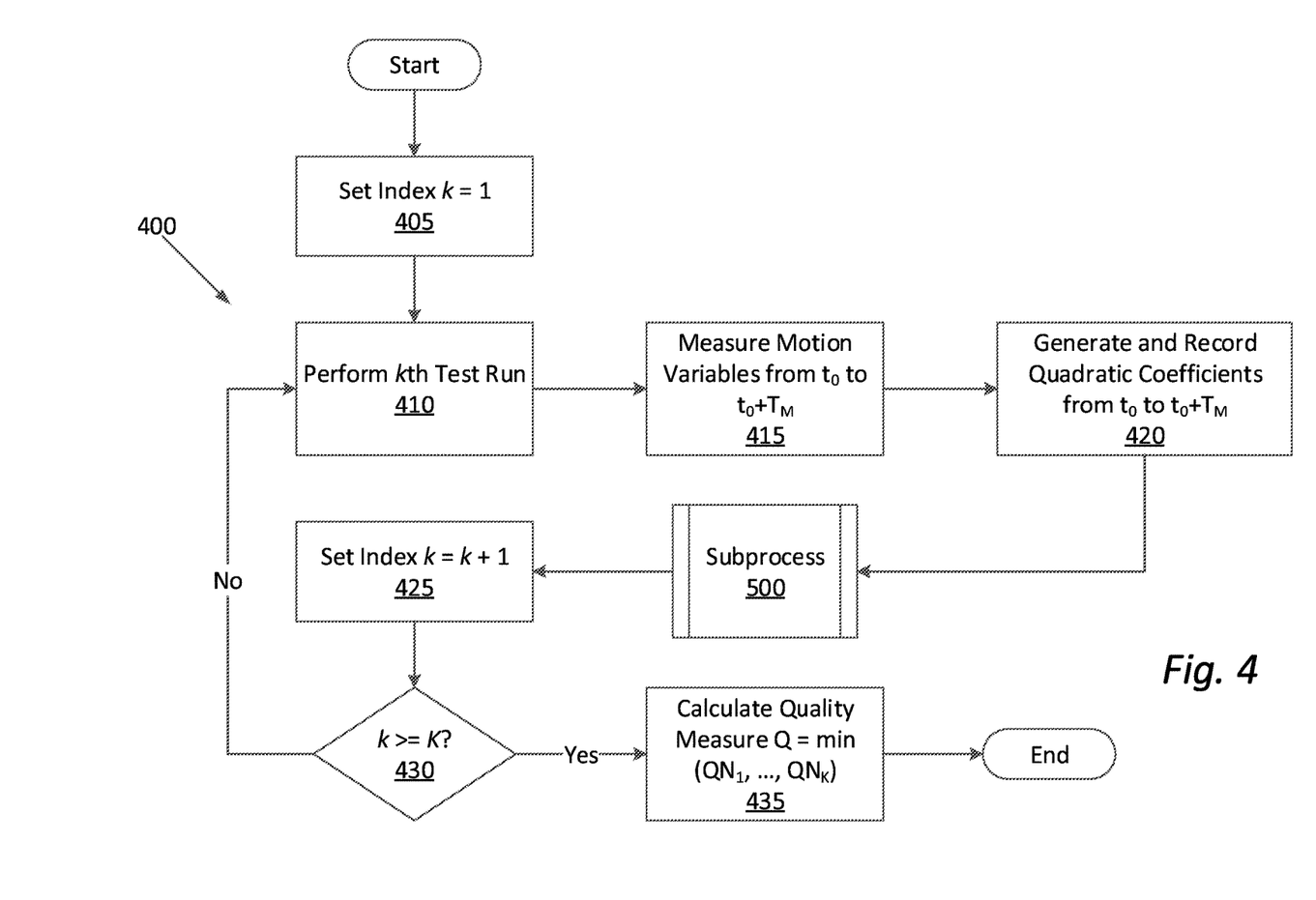
FIG. 4 is a process flow diagram of a process for running a test to determine the quality of the target path prediction.

FIG. 4 is a process flow diagram illustrating the exemplary process 400 for running a test to determine the quality of the target path prediction. The process 400 begins in a block 405, in which the controller 34 initializes an index value k to 1. The index value k counts a number of test runs each of a duration equal to a test-run time limit $T_M$.

Next, in a block 410, the controller 34 performs the kth test run. Performing the test run involves driving the host vehicle 30 for a duration $T_M$ from an initial time $t_0$ to a final time $t_0+T_M$. Driving the host vehicle 30 may be performed autonomously by the controller 34, semi-autonomously by the controller 34 and a human driver, or manually by the human driver. The block 410 begins an experiment cycle through blocks 410 to 430 of a number K of test runs. The number K of test runs is a preset or user-specified value and may be chosen, e.g., to provide a sufficient period to gather a statistically useful set of data, as described below.

Next, during the test run, in a block 415, the controller 34 measures a set of motion variables for the host vehicle 30 and the target vehicle 32. The motion variables may be measured in a known coordinate system such as an objective over-the-ground coordinate system, a host-vehicle-centered coordinate system, or any other suitable coordinate system, and the motion variables may be converted from one coordinate system to another before further use. For example, the controller 34 may measure this set of motion variables in over-the-ground coordinates:

$$\{X_{targ}^M(t), Y_{targ}^M(t), \psi_{targ}^M(t), v_{targ}^M(t), a_{targ}^M(t)\}_{t_0 \leq t \leq t_0 + T_M}$$

$$\{X_{host}^M(t), Y_{host}^M(t), \psi_{host}^M(t), v_{host}^M(t), a_{host}^M(t)\}_{t_0 \leq t \leq t_0 + T_M}$$

in which the subscript host denotes a variable related to the host vehicle 30, the subscript targ denotes a variable related to the target vehicle 32, the superscript M denotes a measured variable, X denotes an over-the-ground X-coordinate, Y denotes an over-the-ground Y-coordinate, ψ denotes an over-the-ground heading angle, v denotes a speed, and a denotes an acceleration. The over-the-ground motion variables may then be converted into the host-vehicle-centered coordinate system:

$$\{x_{targ}^M(t), y_{targ}^M(t), v_{targ}^M(t), a_{targ}^M(t), w_{host}^M(t), v_{host}^M(t), a_{host}^M(t), a^M(t)\}_{t_0 \leq t \leq t_0 + T_M}$$

in which x denotes a lateral position relative to the host vehicle 30, that is, a host-vehicle-centered X-coordinate; y denotes a longitudinal position relative to the host vehicle 30, that is, a host-vehicle-centered Y-coordinate; w denotes a yaw rate; and a denotes a relative heading angle between the host vehicle 30 and the target vehicle 32. The motion variables in the host-vehicle-centered coordinate system are shown in FIG. 7. The motion variables continue to be recorded as the host vehicle 30 moves and as the target vehicle 32 moves along an actual path A.

Next, during the test run, in the block 420, the controller 34 generates coefficients to calculate the predicted position of the target vehicle 32 at the future time using a quadratic polynomial method. A predicted path P, which is a sequence of predicted positions of the target vehicle 32 in the host-vehicle-centered coordinate system fixed at time t, is estimated as a second-order polynomial:

$$x_{targ}^P = a_0(t) + a_1(t) * y_{targ}^P + a_2(t) * (y_{targ}^P)^2$$

in which the superscript P denotes a predicted variable; and $a_0(t)$, $a_1(t)$, and $a_2(t)$ are the coefficients generated by the quadratic polynomial method, as is known. Another method of target path prediction besides the quadratic polynomial method, such as a Kalman filter-based motion-prediction method, may be used.

Figure 5:
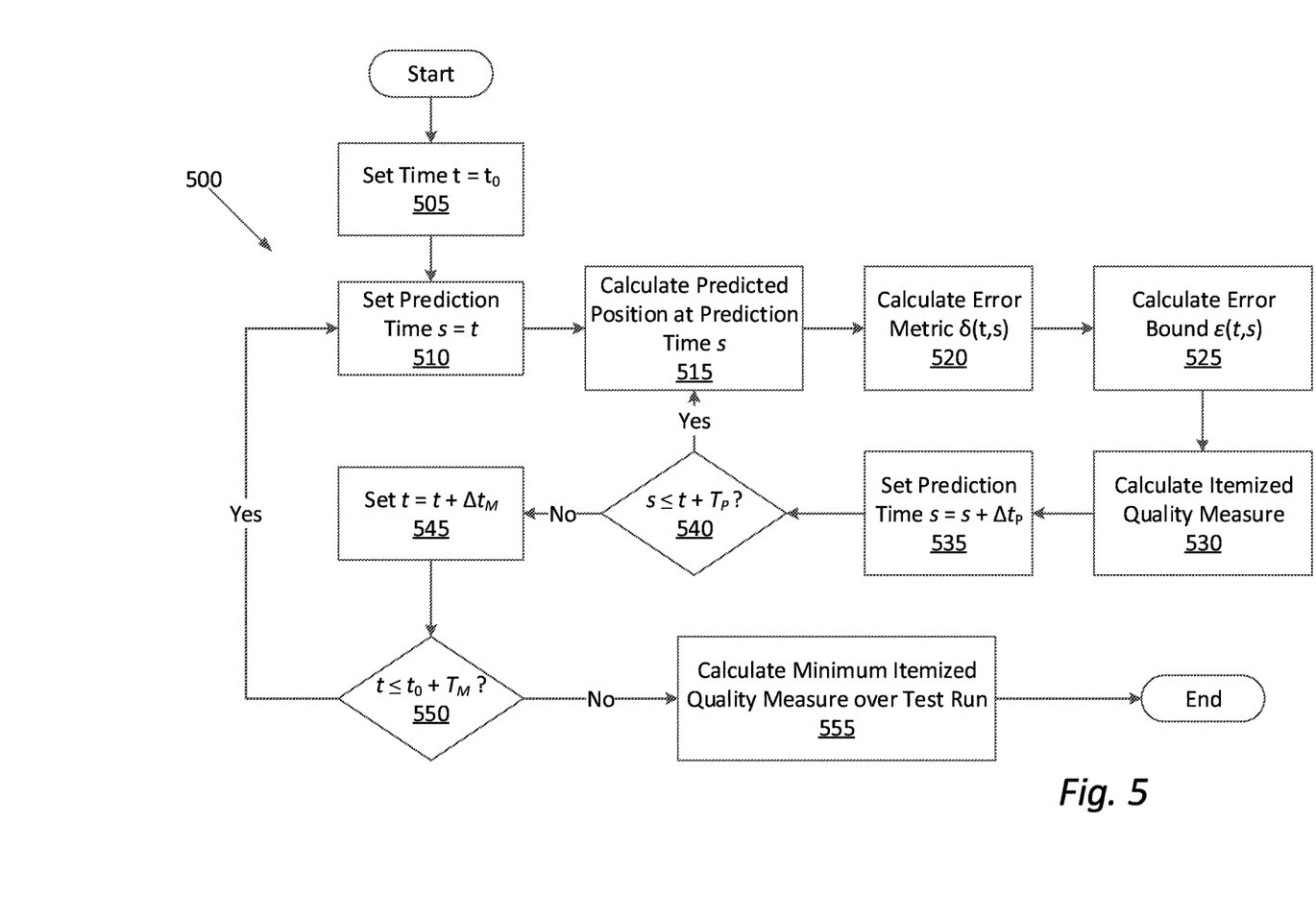
FIG. 5 is a process flow diagram of a process for determining the quality of the target path prediction during a test run.

Next, during the test run, the controller 34 performs an exemplary process 500 for determining the quality of the target path prediction during the test run, as shown in FIG. 5 and described below. The process 500 returns a quality measure $Q_{test}$ of the target path prediction during the test run to the controller 34.

Next, after receiving input from the process 500, in a block 425, the controller 34 increments the index value k by 1, so the index value k is equal to k+1.

Next, in a decision block 430, the controller 34 determines whether the index value k has reached or exceeded the number K of test runs. If the index value k is still below the number K of test runs, then the process 400 proceeds back to the block 410, and the controller 34 performs another loop of the experiment cycle of the blocks 410 to 430 with the update index value k from the block 425.

If the index value k is greater than or equal to the number K of test runs, next, in a block 435, the controller 34 calculates the quality measure Q equal to a minimum value during the period of the experiment of a lesser value of 1 and a ratio of the error bound ε and the error metric δ, as described below with respect to the process 500. In other words, the controller 34 calculates the lowest minimum itemized quality measure $Q_{test}$:

$$Q = \min_{k \in [1,K]} Q_{test}$$

After the block 435, the process 400 ends.

FIG. 5 is a process flow diagram illustrating the exemplary process 500 for determining the quality of the target path prediction during the test run. The process 500 begins in a block 505, in which the controller 34 initializes a time variable t to an initial value $t_0$.

Next, in a block 510, the controller 34 initializes a prediction time variable s to the value of the time variable t. The time variable t tracks the current time, and the prediction time variable s tracks the future time for predictions. The block 510 begins a test-run cycle through blocks 510 to 550 for a duration equal to the test-run time limit $T_M$. The test-run time limit $T_M$ is a preset value and may be chosen, e.g., to provide a sufficient period to gather a statistically useful set of data, as described below.

Next, in a block 515, the controller 34 calculates the predicted position $(x_{targ}^P(s), y_{targ}^P(s))$ of the target vehicle 32 at the future time s. The controller 34 may use known methods, including the quadratic polynomial method using the coefficients determined above. For example, the controller 34 may use this set of equations:

$$x_{targ}^P(s) = a_0(t) + a_1(t) * y_{targ}^P(s) + a_2(t) * (y_{targ}^P(s))^2$$

$$y_{targ}^P(s) = y_{targ}^M(t) + v_{targ}^M(t) * \sin\left(a^M(t) + \frac{\pi}{2}\right) * (s - t) +$$
$$\frac{1}{2} a_{targ}^M(t) * \sin\left(a^M(t) + \frac{\pi}{2}\right) * (s - t)^2$$

Alternatively, the controller 34 may only calculate the predicted lateral position $x_{targ}^P(s)$ relative to the host vehicle 30. The block 515 begins a prediction cycle through blocks 515 to 540 for a duration equal to a prediction time limit $T_P$. The prediction time limit $T_P$ is a preset value and may depend on, e.g., a sensitivity of the sensors 36 or a processing speed of the controller 34.

Next, in a block 520, the controller 34 calculates an error metric δ equal to an absolute value of a difference of the predicted position and a measured position at the future time of the target vehicle 32 relative laterally to the current position and orientation of the host vehicle 30, as described in the following equation:

$$\delta(t,s) = |x_{targ}^M(s) - x_{targ}^P(s)|$$

If the quadratic polynomial method is used, then the error metric δ becomes:

$$\delta(t,s) = |x_{targ}^M(s) - (a_0(t) + a_1(t) * y_{targ}^M(s) + a_2(t) * (y_{targ}^M(s))^2)|$$

In both equations for the error metric δ, the measured position $(x_{targ}^M(s), y_{targ}^M(s))$ is measured at the prediction time s in the host-vehicle-centered coordinate system fixed at time t.

Next, in the block 525, the controller 34 calculates the error bound ε for confidence intervals of the predicted position at the future time of the target vehicle 32 relative laterally to the current position and orientation of the host vehicle 30 at the current time based on the current position and velocity of the target vehicle 32 and the future time. A position of the target vehicle 32 "relative laterally to" a position of the host vehicle 30 refers to the lateral position x relative to the host vehicle 30, that is, the host-vehicle-centered X-coordinate. The error bound may be further based on the current velocity and yaw rate of the host vehicle 30 and the relative heading angle between the host and target vehicles 30, 32. The error bound ε may have a linear relationship with the future time s. The error bound ε may be determined from this equation:

$$\varepsilon(t,s) = b(t) * (s-t) + c(t)$$

in which $b(t)$ and $c(t)$ are control variables for the error bound ε. The control variables $b(t)$ and $c(t)$ are determined from these equations using the motion variables as inputs:

$$b(t) = \frac{1}{1 + \cos(a^M(t))} * \left(\frac{|x_{targ}^M(t)| + \sigma_{x_{targ}}}{\overline{x}_{targ}}\right) * \left(\frac{|y_{targ}^M(t)| + \sigma_{y_{targ}}}{\overline{y}_{targ}}\right) *$$

$$\left(\frac{|v_{targ}^M(t)| + \sigma_{v_{targ}}}{\overline{v}_{targ}}\right) * \left(\frac{|v_{host}^M(t)| + \sigma_{v_{host}}}{\overline{v}_{host}}\right) * \left(\frac{|w_{host}^M(t)| + \sigma_{w_{host}}}{\overline{w}_{host}}\right)$$

$$c(t) = \sqrt{\frac{(x_{targ}^M(t))^2 + (y_{targ}^M(t))^2}{\overline{b}}}$$

in which ε is the error bound; t is the current time; s is the future time; $(x_{targ}^M(t), y_{targ}^M(t))$ is the current position of the target vehicle 32 in a host-vehicle-centered coordinate system; $v_{targ}^M(t)$ is the current velocity of the target vehicle 32; $v_{host}^M(t)$ is the current velocity of the host vehicle 30; $w_{host}^M(t)$ is the current yaw rate of the host vehicle 30; $\alpha^M(t)$ is the relative heading angle between the host and target vehicles 30, 32; $\overline{x}_{targ}$ is a lateral offset bound for the target vehicle 32; $\overline{y}_{targ}$ is a longitudinal offset bound for the target vehicle 32; $\overline{b}$ is a location bound for the target vehicle 32; $\overline{v}_{targ}$ is a velocity bound for the target vehicle 32; $\overline{v}_{host}$ is a velocity bound for the host vehicle 30; $\overline{w}_{host}$ is a yaw rate bound for the host vehicle 30; and $\sigma_{x_{targ}}, \sigma_{y_{targ}}, \sigma_{v_{targ}}, \sigma_{v_{host}}$, and $\sigma_{w_{host}}$ are default initialization values. As calculated in the above equation, the error bound ε is based only on inputs consisting of the current position and velocity of the target vehicle 32, the future time, the current velocity and yaw rate of the host vehicle 30, and the relative heading angle between the host and target vehicles 30, 32.

Next, in a block 530, the controller 34 calculates an itemized quality measure $Q_{item}$ for the prediction time s. The itemized quality measure $Q_{item}$ is equal to the lesser of 1 and a ratio of the error bound ε and the error metric δ; in other words, the itemized quality measure $Q_{item}$ is equal to 1 if the error bound ε is at least as great as the error metric δ:

$$Q_{item}(t,s) = \begin{cases} 1 & \text{if } \delta(t,s) \leq \varepsilon(t,s) \\ \frac{\varepsilon(t,s)}{\delta(t,s)} & \text{otherwise} \end{cases}$$

Next, in a block 535, the controller 34 increments the prediction time s by an incremental prediction time step $\Delta T_P$. In other words, the prediction time s is changed to $s+\Delta T_P$. The incremental prediction time step $\Delta T_P$ is a preset value for a duration of each loop of the prediction cycle. The incremental prediction time step $\Delta T_P$ may depend on, e.g., a sensitivity of the sensors 36 or a processing speed of the controller 34.

Next, in a decision block 540, the controller 34 determines whether the prediction cycle has not yet reached the prediction time limit $T_P$. In other words, the controller 34 determines whether the prediction time s is less than or equal to $t+T_P$. If the prediction time s is less than or equal to $t+T_P$, then the process 500 proceeds back to the block 515, and the controller 34 performs another loop of the prediction cycle of the blocks 515 to 540 with the same time t and the updated prediction time s from the block 535.

If the prediction time s is greater than $t+T_P$, next, in a block 545, the controller 34 increments the time t by the incremental time step $\Delta t_M$. In other words, the time t is changed to $t+\Delta t_M$. The incremental prediction time step $\Delta t_M$ is a preset value for a duration of each loop of the test-run cycle. The incremental prediction time step $\Delta t_M$ may depend on, e.g., a sensitivity of the sensors 36 or a processing speed of the controller 34.

Next, in a decision block 550, the controller 34 determines whether the test-run cycle has not yet reached the test-run time limit $T_M$. In other words, the controller 34 determines whether the time t is less than or equal to $t_0+T_M$. If the time t is less than or equal to $t_0+T_M$, then the process proceeds back to the block 510, and the controller 34 performs another loop of the test-run cycle of the blocks 510 to 550 with the updated time t from the block 545.

If the time t is greater than $t_0+T_M$, next, in a block 555, the controller 34 calculates the minimum itemized quality measure $Q_{test}$, which is the lowest itemized quality measure $Q_{item}$ over the test run:

$$Q_{test} = \min_{t \in [0, t+T_M]} \left( \min_{s \in [t, t+T_P]} Q_{item}(t,s) \right)$$

After the block 555, the process 500 ends.

FIG. 6 is a process flow diagram illustrating the exemplary process 600 for operating the host vehicle 30 using target path prediction. The process 600 begins in a block 605. The controller 34 measures a set of motion variables for the host vehicle 30 and the target vehicle 32, as described above with respect to the block 415.

Next, in a block 610, the controller 34 generates coefficients to calculate the predicted position of the target vehicle 32 at the future time using a quadratic polynomial method, as described with respect to the block 420.

Next, in a block 615, the controller 34 initializes the prediction time s to the value of the time t.

Next, in a block 620, the controller 34 calculates the predicted position $(x_{targ}^P(s), y_{targ}^P(s))$ of the target vehicle 32 at the future time s, as described above with respect to the block 515.

Next, in a block 625, the controller 34 calculates an error bound ε for confidence intervals of the predicted position $(x_{targ}^P(s), y_{targ}^P(s))$ at the future time s of the target vehicle 32 relative laterally to the current position and orientation of the host vehicle 30 at the current time, as described above with respect to the block 525.

Next, in a block 630, the controller 34 calculates an error-bounded predicted position $(x_{targ}^{P,err}(s), y_{targ}^{P,err}(s))$ at the future time s. Specifically, the controller 34 may apply the error bound ε to the lateral predicted position $x_{targ}^P(s)$ relative to the host vehicle 30. The error-bounded predicted position is given by these equations:

$$\begin{cases} x_{targ}^{P,err}(s) = x_{targ}^{P}(s) \pm \varepsilon(t, s) \\ y_{targ}^{P,err}(s) = y_{targ}^{P}(s) \end{cases}$$

Next, in a block 635, the controller 34 determines an autonomous operation to perform for driving the host vehicle 30 based on the error-bounded predicted position, that is, based on the predicted position and the error bound. An "autonomous operation" is an action by one or more of the steering system 40, the propulsion 42, and the brakes 44 upon instruction by the controller 34, for example, activating the brakes 44 with a given force for a given period of time, changing a steering angle by a given number of degrees, etc. Specifically, if the host vehicle 30 may cross a region specified by the error-bounded predicted position, then the controller 34 may control a vehicle subsystem to evade the target vehicle 32 based on the predicted position and the error bound. Vehicle subsystems include, for example, the steering system 40, propulsion 42, and brakes 44. Controlling the vehicle subsystem may include the steering system 40 to turn, instructing the propulsion 42 to accelerate, and/or instructing the brakes 44 to brake.

Next, in a block 640, the controller 34 increments the prediction time s by the incremental prediction time step $\Delta T_P$, as described above with respect to the block 535.

Next, in a decision block 645, the controller 34 determines whether the prediction cycle has not yet reached the prediction time limit $T_P$. In other words, the controller 34 determines whether the prediction time s is less than or equal to t+$T_P$. If the prediction time s is less than or equal to t+$T_P$, then the process 600 proceeds back to the block 620, and the controller 34 performs another loop of the blocks 620 to 645 with the same time t and the updated prediction time s from the block 640. If the prediction time s is greater than t+$T_P$, then the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller comprising a processor and a memory storing processor-executable instructions, wherein the processor is programmed to:
   calculate an error bound for confidence intervals of a predicted position of a target vehicle; and
   instruct a steering system of a host vehicle to turn based on the error bound;
   wherein the predicted position is at a future time;
   the predicted position is relative laterally to a current position and orientation of the host vehicle at a current time;
   calculating the error bound is based on a current position and velocity of the target vehicle and the future time; and
   the error bound is a product of the future time and a value that is constant with respect to the future time.

2. The controller of claim 1, wherein the error bound is further based on a current velocity and yaw rate of the host vehicle.

3. The controller of claim 2, wherein the error bound is further based on a relative heading angle between the host and target vehicles.

4. The controller of claim 3, wherein the error bound has a linear relationship with the future time.

5. The controller of claim 4, wherein the error bound is determined from an equation:

$$\varepsilon(t,s) = b(t)*(s-t) + c(t), \text{ in which}$$

$$b(t) = \frac{1}{1+\cos(a^M(t))} * \left(\frac{|x_{targ}^M(t)| + \sigma_{x_{targ}}}{\bar{x}_{targ}}\right) * \left(\frac{|y_{targ}^M(t)| + \sigma_{y_{targ}}}{\bar{y}_{targ}}\right) *$$
$$\left(\frac{|v_{targ}^M(t)| + \sigma_{v_{targ}}}{\bar{v}_{targ}}\right) * \left(\frac{|v_{host}^M(t)| + \sigma_{v_{host}}}{\bar{v}_{host}}\right) * \left(\frac{|w_{host}^M(t)| + \sigma_{w_{host}}}{\bar{w}_{host}}\right), \text{ and}$$

$$c(t) = \sqrt{\frac{(x_{targ}^M(t))^2 + (y_{targ}^M(t))^2}{\bar{b}}};$$

in which
$\varepsilon$ is the error bound, t is the current time, s is the future time, $(x_{targ}^M(t), y_{targ}^M(t))$ is the current position of the target vehicle in a host-vehicle-centered coordinate system, $v_{targ}^M(t)$ is the current velocity of the target vehicle, $v_{host}^M(t)$ is the current velocity of the host vehicle, $w_{host}^M(t)$ is the current yaw rate of the host vehicle, $\alpha^M(t)$ is the relative heading angle between the host and target vehicles, $\bar{x}_{targ}$ is a lateral offset bound for the target vehicle, $\bar{y}_{targ}$ is a longitudinal offset bound for the target vehicle, $\bar{b}$ is a location bound for the target vehicle, $\bar{v}_{targ}$ is a velocity bound for the target vehicle, $\bar{v}_{host}$ is a velocity bound for the host vehicle, $\bar{w}_{host}$ is a yaw rate bound for the host vehicle, and $\sigma_{x_{targ}}$, $\sigma_{y_{targ}}$, $\sigma_{v_{targ}}$, $\sigma_{v_{host}}$ and $\sigma_{w_{host}}$ are default initialization values.

6. The controller of claim 3, wherein the error bound is based on inputs consisting of the current position and velocity of the target vehicle, the future time, the current velocity and yaw rate of the host vehicle, and the relative heading angle between the host and target vehicles.

7. The controller of claim 1, wherein the processor is further programmed to calculate the predicted position at the future time.

8. The controller of claim 7, wherein the processor is programmed to generate coefficients to calculate the predicted position at the future time using a quadratic polynomial method.

9. The controller of claim 7, wherein the processor is further programmed to control a vehicle subsystem to evade the target vehicle based on the predicted position and the error bound.

10. The controller of claim 9, wherein controlling the vehicle subsystem includes instructing brakes to brake.

11. The controller of claim 9, wherein controlling the vehicle subsystem includes instructing the steering system to turn.

12. The controller of claim 1, wherein the processor is further programmed to calculate an error metric equal to an absolute value of a difference of the predicted position and a measured position of the target vehicle;
   wherein the measured position is at the future time; and
   the measured position is relative laterally to the current position and orientation of the host vehicle.

13. The controller of claim 12, wherein the processor is further programmed to calculate a quality measure equal to a minimum value of a lesser value of 1 and a ratio of the error bound to the error metric, wherein the minimum value is calculated over a period.

14. The controller of claim 13, wherein the processor is further programmed to disable a feature relying on the error bound based on the quality measure.

15. The controller of claim 14, wherein the feature is one of automated braking, automated steering, and autonomous operation.

16. A method comprising:
calculating an error bound for confidence intervals of a predicted position of a target vehicle; and
instructing a steering system of a host vehicle to turn based on the error bound;
wherein the predicted position is at a future time;
the predicted position is relative laterally to a current position and orientation of the host vehicle at a current time;
calculating the error bound is based on a current position and velocity of the target vehicle and the future time; and
the error bound is a product of the future time and a value that is constant with respect to the future time.

17. The method of claim 16, wherein the error bound is further based on a current velocity and yaw rate of the host vehicle and a relative heading angle between the host and target vehicles.

18. The method of claim 17, further comprising calculating an error metric equal to an absolute value of a difference of the predicted position and a measured position of the target vehicle;
wherein the measured position is at the future time; and
the measured position is relative laterally to the current position and orientation of the host vehicle.

19. The method of claim 18, further comprising calculating a quality measure equal to a minimum value of a lesser value of 1 and a ratio of the error bound to the error metric, wherein the minimum value is calculated over a period.

20. The method of claim 19, further comprising adjusting a path prediction algorithm based on the quality measure.

* * * * *